(12) United States Patent
Tu et al.

(10) Patent No.: US 11,092,870 B2
(45) Date of Patent: Aug. 17, 2021

(54) VISIBLE LIGHT BAND REFLECTION METASURFACE DEVICE AND REFLECTED LIGHT WAVELENGTH MODULATION METHOD

(71) Applicant: SOUTHEAST UNIVERSITY, Nanjing (CN)

(72) Inventors: Yan Tu, Nanjing (CN); Lanlan Yang, Nanjing (CN); Jingjing Guo, Nanjing (CN); Lili Wang, Nanjing (CN); Baoping Wang, Nanjing (CN); Yuning Zhang, Nanjing (CN); Xuefei Zhong, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 637 days.

(21) Appl. No.: 16/073,509

(22) PCT Filed: Jan. 29, 2018

(86) PCT No.: PCT/CN2018/074414
§ 371 (c)(1),
(2) Date: Jul. 27, 2018

(87) PCT Pub. No.: WO2018/161734
PCT Pub. Date: Sep. 13, 2018

(65) Prior Publication Data
US 2021/0215991 A1    Jul. 15, 2021

(30) Foreign Application Priority Data

Mar. 6, 2017 (CN) .......................... 201710127452.X

(51) Int. Cl.
*G02F 1/19* (2019.01)
*G02F 1/01* (2006.01)

(52) U.S. Cl.
CPC .............. *G02F 1/19* (2013.01); *G02F 1/0126* (2013.01)

(58) Field of Classification Search
None
See application file for complete search history.

(56) References Cited

U.S. PATENT DOCUMENTS

2018/0240653 A1* 8/2018 Akselrod ............. H04N 5/2253

* cited by examiner

*Primary Examiner* — Ashok Patel
(74) *Attorney, Agent, or Firm* — CBM Patent Consulting, LLC

(57) ABSTRACT

A visible light band reflection metasurface device and a reflected light wavelength modulation method. The device successively includes, from top to bottom, a metal metasurface layer with periodically arranged antenna units, a modulation layer formed by an electro-optic material, a metal reflection layer and a substrate layer; the antenna unit period is less than the incident wavelength, and the thickness is greater than the skin depth of metal and less than 100 nm; the thickness of the modulation layer is less than the wavelength of the incident light; and the thickness of the metal reflection layer is greater than the skin depth of metal and less than the wavelength of the incident light; and an external voltage source can modulate the color of the reflected light, and can achieve voltage modulation of the color of reflected light in the visible light band.

10 Claims, 5 Drawing Sheets

VISIBLE LIGHT BAND REFLECTION METASURFACE DEVICE AND REFLECTED LIGHT WAVELENGTH MODULATION METHOD

TECHNICAL FIELD

The present application relates to the technical field of optical imaging, and particularly relates to a reflective metasurface device and a reflected light wavelength modulation method in visible light band.

BACKGROUND ART

A metasurface is a class of ultrathin flat optical elements which can manipulate phase, amplitude and polarization of free-space waves. The metasurface is a kind of two-dimensional array of metamaterial units. It shows an excellent electromagnetic wave modulation ability when serving as an interface between two media. Polarization, phase and amplitude modulation of a wave beam can be realized in the process of wave propagation, following the generalized Snell's Law.

A conventional phase-type diffractive optical element modulates light field by changing its own thickness, which makes devices large and heavy. A unit size and a layer thickness of the metasurface device are much less than a wavelength, and its ability of wavelength modulation breaks through the diffraction limit of the original optical elements. A tunable metasurface is designed to enhance the modulation flexibility of electromagnetic waves. With integration of optical imaging and lightweight of a display device, advantages of metasurface in steering electromagnetic waves exhibit huge potential application values.

Existing reports mainly focus on tunable metasurface device in the infrared band, spectra modulation in the visible light band has not been reported so far, and even no application in metasurface display with narrow bandwidth and tunable color. The main reason is the small size of metasurface in the visible light band, high absorption in the blue-green band and difficulty in color modulation at low voltage bias.

SUMMARY OF THE INVENTION

Objective of the present invention: in order to solve shortcomings of the prior art, a tunable visible light band reflection metasurface device, a color micro-display device and an electric modulation method of reflection wavelength are provided.

Technical schemes: a visible light band reflection metasurface device, the device successively includes, from top to bottom, a metal metasurface layer with periodically arranged antenna units, a modulation layer formed by an electro-optic material, a metal reflection layer and a substrate layer; the antenna unit period is less than a wavelength of incident light, and the thickness is greater than the skin depth of the metal and less than 100 nm; the thickness of the modulation layer is less than the wavelength of the incident light; and the thickness of the metal reflection layer is greater than the skin depth of metal and less than the wavelength of the incident light.

The metal metasurface layer is composed of periodically arranged antenna units with metallic protrusion structure or its Babinet-inverted structure (slot structure). An antenna shape of the metal metasurface layer is a strip, a V shape, an H shape, a U shape or a C shape. Materials of the metal metasurface layer and the metal reflection layer are gold, silver, aluminum, copper, gold-silver alloys, gold-aluminum alloys, gold-copper alloys, silver-aluminum alloys, silver-copper alloys or copper-aluminum alloys; and a substrate material is a semiconductor material.

The modulation layer is an electro-optic material operating in the visible light band with an electro-optic coefficient on the magnitude order of 1 nm/V; when the metal metasurface layer is the antenna protrusion structure, the refractive index of the electro-optic material is greater than or equal to 2; and when the metal metasurface layer is slot structure, the refractive index of the electro-optic material is less than 2.

A reflected light wavelength modulation method based on the proposed metasurface device includes the following steps:

(1) judging whether the metal metasurface layer is a metal antenna protrusion structure if the metal metasurface layer is the metal antenna protrusion structure, adding an ITO thin film layer onto the upper side of the metal metasurface layer, and then executing step (2); if not, directly skipping to execute step (2);

(2) connecting a DC voltage source
connecting a positive output end of the DC voltage source with the metal metasurface layer, and grounding a negative output end of the DC voltage source and the metal reflection layer together;

(3) modulating a reflection wavelength
enabling an incident light to enter into the metasurface layer of the metasurface device, and adjusting the voltage of the DC voltage source to change the refractive index of the modulation layer, thereby changing the peak wavelength of a cross-polarized reflected light.

The details of step (2) are listed as follows:
if the metal metasurface layer is a metal antenna protrusion structure, it is necessary to add a transparent ITO thin film on the surface of the metal metasurface layer for electric conduction; and the positive output end of the DC voltage source is connected with the transparent ITO thin film fitted on the metal metasurface layer, while the negative input end of the DC voltage source and the metal reflection layer are grounded together;

if the metal metasurface layer is a metal slot structure, the positive output end of the DC voltage source is connected with the metal metasurface layer, while the negative input end of the DC voltage source and the metal reflection layer are grounded together.

Furthermore, the incident light is linear polarized or circular polarized wave with wide waveband, and is vertically incident to the metal metasurface layer. The reflected light is one beam of light waves, or two beams of light waves symmetrically distributed at both sides of the incident light wave. The absolute value of the voltage of the DC voltage source is greater than or equal to 0 and less than $V_{max}$, wherein $V_{max}$ is the breakdown voltage of metal metasurface layer-modulation layer-metal reflection layer.

Beneficial effects: compared with the prior art, the reflection metasurface device of the present invention operates in the visible light band, and has advantages of narrow response bandwidth, high polarization transfer efficiency and broad modulation spectra range; a color micro-display device based on the reflection metasurface device, the device can help to achieve dynamic display of colors by serving as a color filter of a microdisplay image source pixel; and the reflection wavelength modulation method based on the reflection metasurface device has the advantages that an external voltage source can change the color of reflected light so that it can realize voltage modulation of the color of reflected light in the visible light band, and the reflectivity is higher than 50%, which is suitable for practical application of high resolution dynamic display. It has enlightenment significance and extensive application prospects in the fields of super-high-resolution display and holographic imaging.

DETAILED DESCRIPTION OF THE INVENTION

Hereinafter, technical schemes of the present invention are further explained and described by means of specific implementations in conjunction with the accompanying drawings, but the scope of protection of the present invention is not limited to the following embodiments. The following specific implementations are merely illustrative but not restrictive, and should include the whole disclosure of the claims. Further, the person skilled in the art can realize the whole disclosure of the claims from one of the following embodiments. The person of ordinary skill in the art can, under the enlightenment of the present invention, make various forms without departing from the spirit of the present invention and the scope claimed by the claims, which are all within the protection of the present invention.

Figure 1:
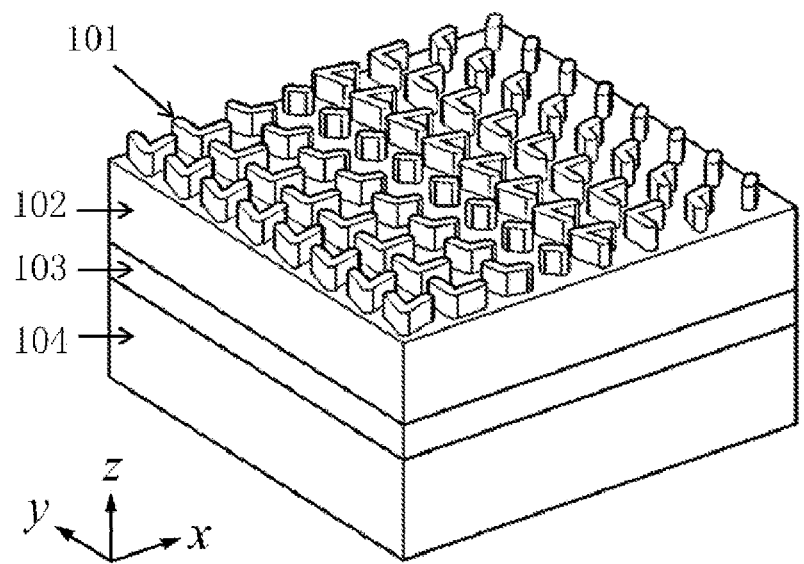
FIG. 1(a) is a schematic diagram of a reflective metasurface device with a protrusion structure.
FIG. 1(b) is a schematic diagram of a reflective metasurface device with a slot structure.
Figure 1:
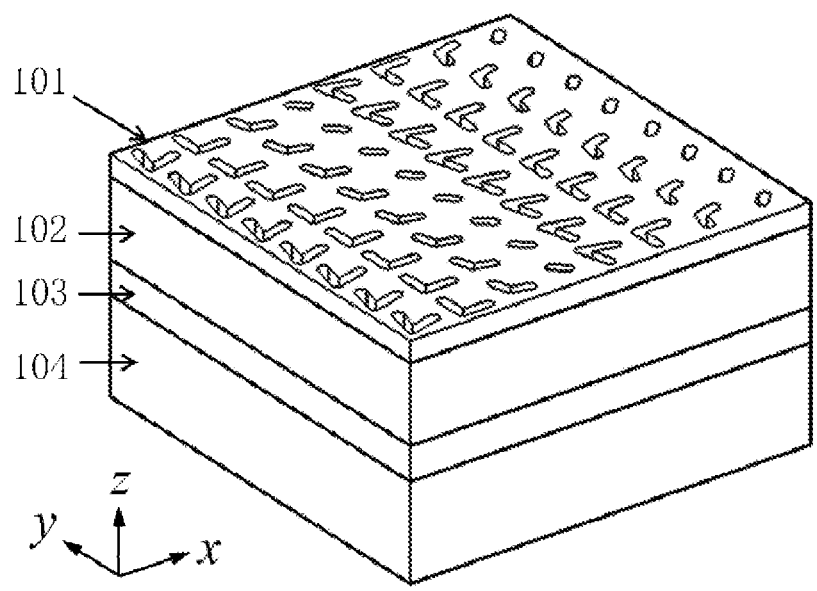

As shown in FIG. 1(a), a visible light band reflection metasurface device of the present invention successively includes from top to bottom: a metal metasurface layer 101 with periodically arranged nano-antennas, a modulation layer 102 formed by an electro-optic material, and a continuous metal reflection layer 103 and a substrate layer 104. The metal metasurface layer is a structure formed by periodically arranged metasurface units (namely, metal antennas) with a specific period in both x and y directions, and mxn metasurface units are included, wherein both m and n are natural numbers greater than or equal to 2, the period of each metasurface unit is less than the wavelength of the incident light, and the thickness thereof is greater than the skin depth of the metal and less than 100 nm. The thickness of the modulation layer is less than the wavelength of the incident light. The thickness of the metal reflection layer is greater than the skin depth of the metal and less than the wavelength of the incident light.

The metal metasurface layer has two structures, wherein one structure is a metal antenna protrusion structure shown in FIG. 1(a), and the other structure is a Babinet-inverted structure of the metal antenna protrusion structure, namely, a metal slot structure shown in FIG. 1(b).

Materials of the metal metasurface layer and the metal reflection layer are gold, silver, aluminum, copper, gold-silver alloys, gold-aluminum alloys, gold-copper alloys, silver-aluminum alloys, silver-copper alloys or copper-aluminum alloys; and skin depths of the above metals are greater than 20 nm.

The modulation layer is formed by an electro-optic material whose working frequency covers the visible light band, and it has a large electro-optic coefficient, namely, a 1 nm/V magnitude order of the electro-optic coefficient, and the refractive index of the electro-optic material can be modulated by a voltage. The minimum value of the electro-optic coefficient of the electro-optic material is determined by voltage amplitude, modulation layer thickness, and material breakdown threshold. When the metal metasurface layer is the metal antenna protrusion structure, the refractive index of the electro-optic material should be greater than or equal to 2; and when the metal metasurface layer is the metal slot structure, the refractive index of the electro-optic material should be less than 2. This relationship between the geometry of the metasurface antenna unit and the refractive index of the modulation layer is an important condition for ensuring high reflectivity.

A substrate material may be a semiconductor such as silicon and silicon dioxide.

A shape of the metal antenna may be a strip, a V shape, an H shape, a U shape, a C shape or other shapes; and spectral responses of different antenna shapes are different.

The design of geometrical features of an antenna such as length, width and intersection angel can cause incident light to generate phase modulation of 0~2π, thus achieving wide-angle reflection.

The visible-light-band reflection metasurface device of the present invention uses an electron beam lithography technology and lift-off technology in the process of fabrication. Firstly, the metal reflection layer and the electro-optic material are deposited onto a substrate through electron beam evaporation; a positive PMMA etchant resist layer is spin coated on the electro-optic material layer, and then baked at 180° C. for 2 minutes; nano-antennas are etched on the PMMA by the electron beam lithography technology, then deposited onto a sample by thermally evaporating a metal thin film, and then lifted off so as to obtain a metasurface structure.

Figure 2:
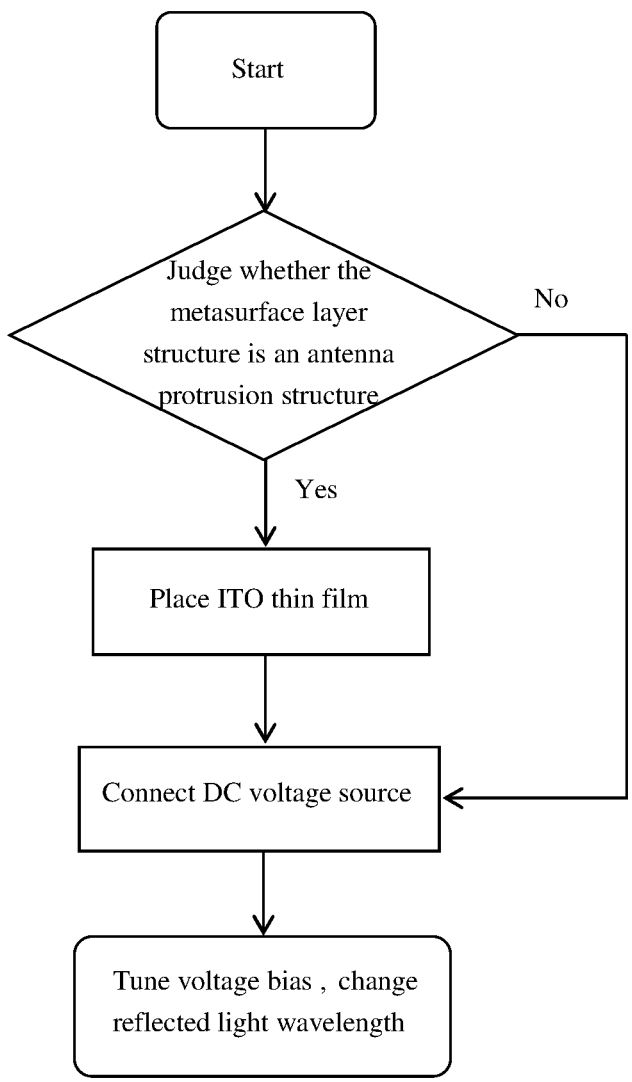
FIG. 2 is a flow block diagram of a reflection wavelength modulation method in the visible light band based on the reflection metasurface device.

A reflection wavelength modulation method in the visible light band based on the reflection metasurface device described above includes the following steps as shown in FIG. 2:

(1) judging whether the metal metasurface layer is a metal antenna protrusion structure if the metal metasurface layer is the metal antenna protrusion structure, adding an ITO thin film layer onto the upper side of the metal metasurface layer, and then executing step (2); if not, directly skipping to execute step (2);

(2) connecting a DC voltage source
connecting a positive output end of the DC voltage source with the metal metasurface layer, and grounding a negative output end of the DC voltage source and the metal reflection layer together;

(3) modulating a reflection wavelength
enabling an incident light to enter into the metasurface layer of the metasurface device, and adjusting the voltage of the DC voltage source to change the refractive index of the modulation layer, thereby changing the peak wavelength of cross-polarized reflected light.

Figure 3:
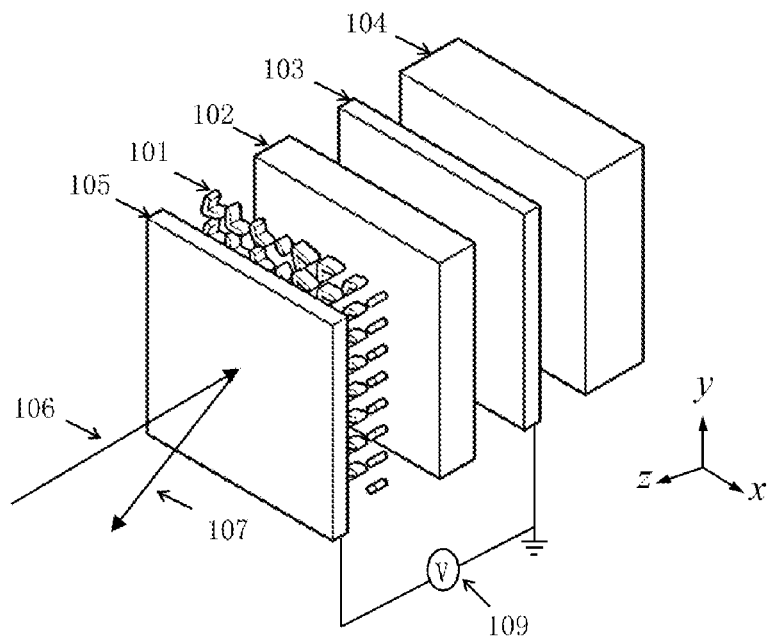
FIG. 3(a) is a schematic diagram of voltage loading of a tunable reflection metasurface device with a protrusion structure.
FIG. 3(b) is a schematic diagram of voltage loading of a tunable reflection metasurface device with a slot structure.
Figure 3:
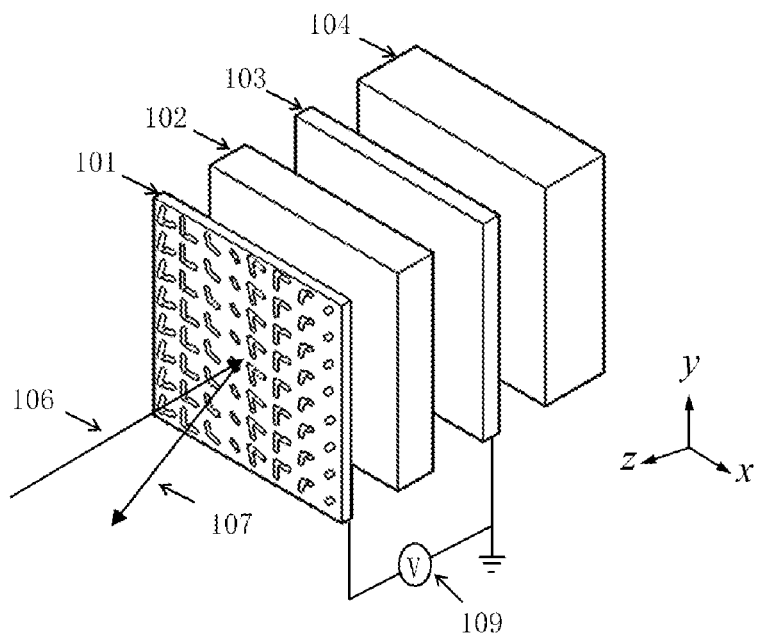

If the metal metasurface layer is the metal antenna protrusion structure, as shown in FIG. 3(a), it is necessary to add a transparent ITO thin film 105 onto the metal metasurface layer for electric conduction. A positive output end of a DC voltage source 109 is connected with the transparent ITO thin film fitted on the metal metasurface layer, and a negative input end of the DC voltage source 109 and the metal reflection layer are grounded together.

If the metal metasurface layer is the metal slot structure, as shown in FIG. 3(b), the positive output end of the DC voltage source is connected with the metal metasurface layer, while the negative input end of the DC voltage source and the metal reflection layer are grounded together.

The absolute value of the voltage of the DC voltage source is greater than or equal to 0 and less than $K_{max}$, wherein $V_{max}$ is a breakdown voltage of metal metasurface layer-modulation layer-metal reflection layer.

A wideband beam 106 of linear polarized or circular polarized incidents vertically onto the device, whose phase is modulated by the metasurface, and generates a cross-polarized reflected light 107 with large reflective angle. The metal metasurface layer-modulation layer-metal reflection layer forms a resonant cavity, similar to metal-dielectric-metal resonator. For a conventional metal-dielectric-metal resonant cavity, upper and lower metals are all continuous metal layers. Surface plasmon can be excited at metal/dielectric interfaces when the cavity length (namely, the thickness of the modulation layer), the refractive index of the materials and the frequency of the incident light meet a resonance condition, so that a filtering effect functions on the wideband incident light, and polarization directions of the exiting light and the incident light are the same. However, for the metal metasurface layer-modulation layer-metal reflection layer resonant cavity in the present invention, the metal metasurface layer is not continuous, and the metasurface layer may generate phase modulation for the incident light and forms cross-polarized reflective light. Therefore, the existence of the resonant cavity may generate the filtering effect on the cross-polarized reflective light. Adjusting the voltage bias to change the refractive index of the electro-optic material of the modulation layer causes a resonance frequency shift, thereby causing a peak wavelength variation of the cross-polarized reflected light and tuning the color of the reflected light.

Embodiment 1

Figure 4:
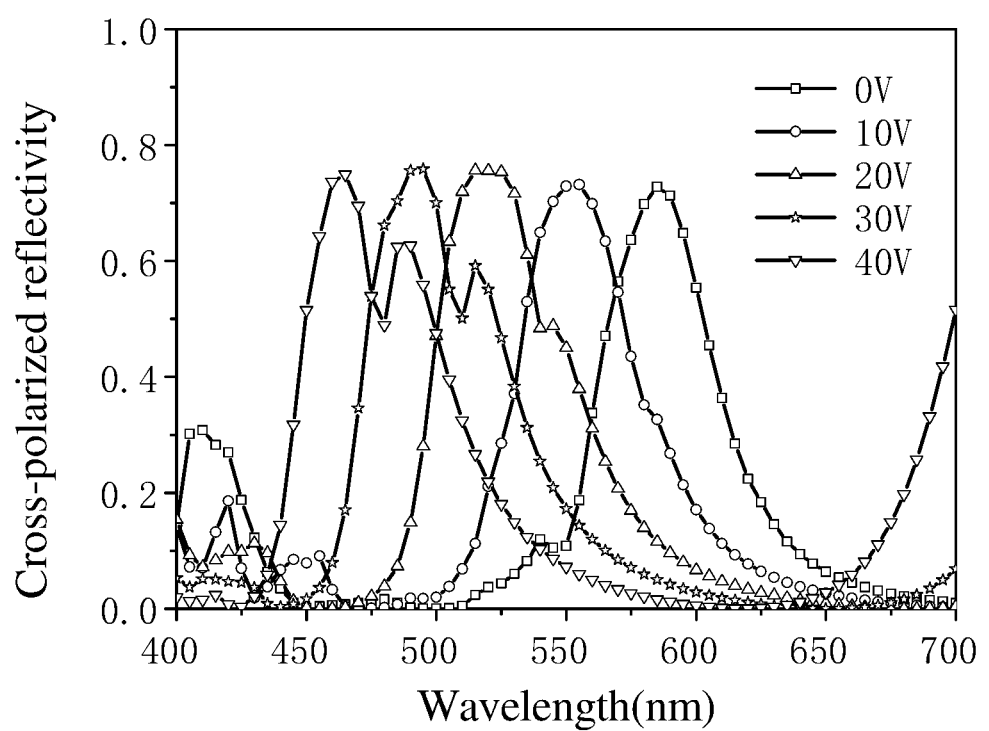
FIG. 4(a) is a graph of the voltage modulation effect of cross-polarized reflectivity of a tunable reflection metasurface device with a protrusion structure.
FIG. 4(b) is a graph of the refractive index modulation effect of cross-polarized reflectivity of a tunable reflection metasurface device with a slot structure.
Figure 4:
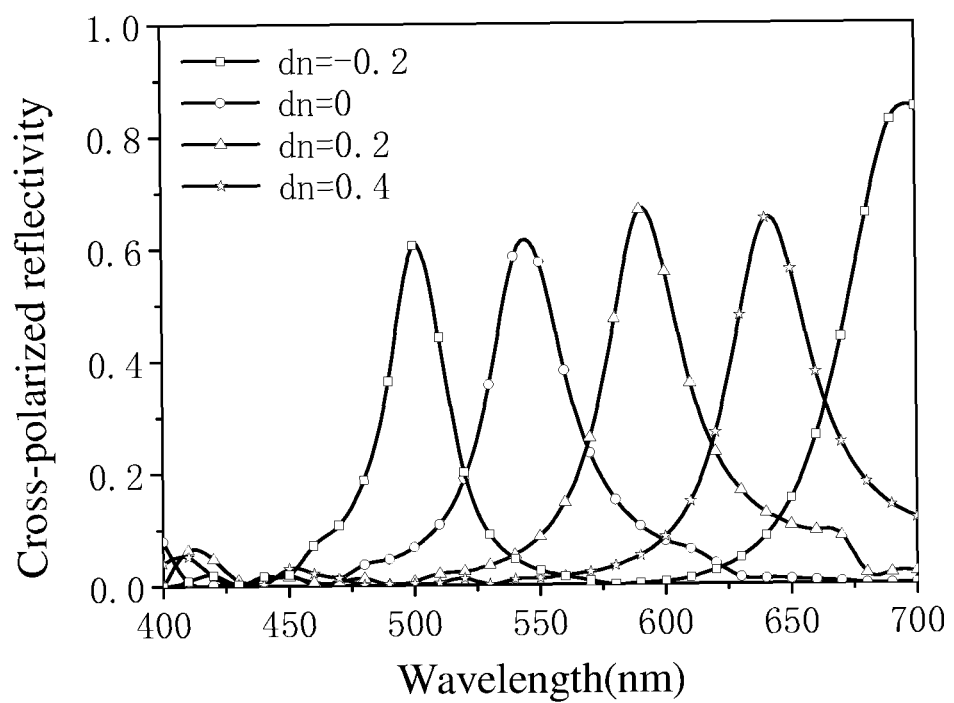

A metal metasurface layer is a metal antenna protrusion structure, the shape of the antenna is a V shape, the antenna unit period is 200 nm, and the thickness is 100 nm; the thickness of a modulation layer is 300 nm; the thickness of a metal reflection layer is 130 nm; and the thickness of a substrate layer is 300 nm. Both the metal metasurface layer and the metal reflection layer are silver, and the refractive index thereof is set according to a common metal refractive index table given by Palik; the material of the modulation layer is organic crystal DAST (4-dimethylamino-N-methyl-4-stilbazolium tosylate), the refractive index n thereof is $n = n_0 + (dn/dE) \cdot E$, wherein no is an average refractive index and is 2.2 in the visible light band, dn/dE is an electro-optic coefficient and is 3.41 nm/V in the visible light band, and E is the electric field intensity; and the substrate material is silicon dioxide. As shown in FIG. 3(a), a transparent ITO thin film is placed on the metal metasurface layer, a DC voltage source with a tunable output voltage is connected externally, the ITO thin film on the metal metasurface layer is loaded with a positive voltage bias, while the metal reflection layer and the negative output end of the voltage source are grounded together. As shown in FIG. 4(a), a 40 nm blue-shift of the cross-polarized reflection resonance wavelength appears for each 10V increase in the voltage bias, and the peak reflectivity of the cross-polarized reflective wave is greater than 70%.

Embodiment 2

A metal metasurface layer is a metal slot structure, the shape of the antenna slot is a V shape, the antenna unit period is 200 nm, and the thickness is 100 nm; the thickness of a modulation layer is 200 nm; the thickness of a metal reflection layer is 130 nm; and the thickness of a substrate layer is 300 nm. Both the metal metasurface layer and the metal reflection layer are silver, whose refractive index is set according to a common metal refractive index table given by Palik; an average refractive index of the material of the modulation layer in the visible light band is 1.4, and the change range of the refractive index along with the voltage is −0.2~0.4; and a substrate material is silicon dioxide. As shown in FIG. 3(b), a DC voltage source with a tunable output voltage is connected externally, the metal metasurface layer is loaded with a positive bias voltage, while the metal reflection layer and a negative output end of the voltage source are grounded together. As shown in FIG. 4(b), a 40 nm red-shift of the cross-polarized reflection resonance wavelength appears when the refractive index increases per 0.2 and the peak reflectivity of the cross-polarized reflected wave is greater than 60%.

The present invention also provides a color micro-display device with light incident vertically from a backlit and image source pattern exiting at 0-90°. Each pixel of the device is composed of metasurface units, each metasurface unit corresponding to a phase with constant amplitude and forming an image source pattern with two-dimensional continuous phase distribution. The color of the image source is controlled by the voltage, and these metasurface units together constitute a time-division multiplexed color micro-display image source.

Although the present invention has been specifically shown and described with reference to the typical cases of the present invention, the person of ordinary skill in the art should understand that multiple modifications can be made to these embodiments in forms and details without departing from the spirit and scope of the present invention defined by the appended claims.

What is claimed is:
1. A visible light band reflection metasurface device, wherein the device successively includes, from top to bottom:
    a metal metasurface layer having a thickness with periodically arranged antenna units,
    a modulation layer having a thickness formed of an electro-optic material,
    a metal reflection layer having a thickness and
    a substrate layer;
    wherein an antenna unit period of the antenna units is less than a wavelength of incident light, and
    wherein a thickness of the modulation layer is greater than a skin-effect depth of metal metasurface layer and less than 100 nm, the skin-effect is defined as a distance that the incident light penetrates into the metal metasurface layer;
    the thickness of the modulation layer is less than the wavelength of the incident light; and a thickness of the metal reflection layer is greater than the skin-effect depth of the metal metasurface layer surface and less than the wavelength of the incident light.

2. The visible light band reflective metasurface device according to claim 1, wherein the metal metasurface layer is composed of periodically arranged antenna units with a protrusion structure or its Babinet-inverted structure or slot structure.

3. The visible light band reflection metasurface device according to claim 1, wherein the antenna shape of the metal metasurface layer is a strip, a V shape, an H shape, a U shape, or a C shape.

4. The visible light band reflection metasurface device according to claim 1, wherein materials of the metal metasurface layer and the metal reflection layer are gold, silver, aluminum, copper, gold-silver alloys, gold-aluminum alloys, gold-copper alloys, silver-aluminum alloys, silver-copper alloys or copper-aluminum alloys; and the substrate material is semiconductor material.

5. The visible light band reflective metasurface device according to claim 1, wherein the modulation layer is formed of an electro-optic material operating in the visible light band and has an electro-optic coefficient with the order of magnitude being 1 nm/V; when the metal metasurface layer is an antenna protrusion structure, a refractive index of the electro-optic material is greater than or equal to 2; and when the metal metasurface layer is a metal slot structure, the refractive index of the electro-optic material is less than 2.

6. A reflected light wavelength modulation method based on the metasurface device according to claim 1, including the following steps:

(1) judging whether the metal metasurface layer is a metal antenna the protrusion structure:
if the metal metasurface layer is the metal antenna protrusion structure, adding an ITO thin film layer on the upper side of the metal metasurface layer, and then executing step (2); if not, directly skipping to execute step (2);

(2) connecting a DC voltage source:
connecting a positive output end of the DC voltage source with the metal metasurface layer, and grounding a negative output end of the DC voltage source and the metal reflection layer together;

(3) modulating a reflection wavelength:
enabling an incident light to enter into the metasurface layer of the metasurface device, and adjusting the voltage of the DC voltage source to change the refractive index of the modulation layer, thereby changing the peak wavelength of cross-polarized reflected light.

7. The reflected light wavelength modulation method according to claim 6, wherein the step (2) is specifically:
if the metal metasurface layer is the metal antenna protrusion structure, it is necessary to add a transparent ITO thin film on the surface of the metal metasurface layer for electric conduction; and the positive output end of the DC voltage source is connected with the transparent ITO thin film fitted on the metal metasurface layer, while the negative input end of the DC voltage source and the metal reflection layer are grounded together;
if the metal metasurface layer is the metal slot structure, the positive output end of the DC voltage source is connected with the metal metasurface layer, while the negative input end of the DC voltage source and the metal reflection layer are grounded together.

8. The reflected light wavelength modulation method according to claim 6, wherein the incident light is linear polarized or circular polarized wave with wide waveband, and is vertically incident to the metal metasurface layer.

9. The reflected light wavelength modulation method according to claim 6, wherein the reflected light is one beam of light waves, or two beams of light waves symmetrically distributed at both sides of the incident light wave.

10. The reflected light wavelength modulation method according to claim 6, wherein an absolute value of the voltage of the DC voltage source is greater than or equal to 0 and less than $V_{max}$, wherein $V_{max}$ is the breakdown voltage of metal metasurface layer-modulation layer-metal reflection layer.

* * * * *